Figure 1:
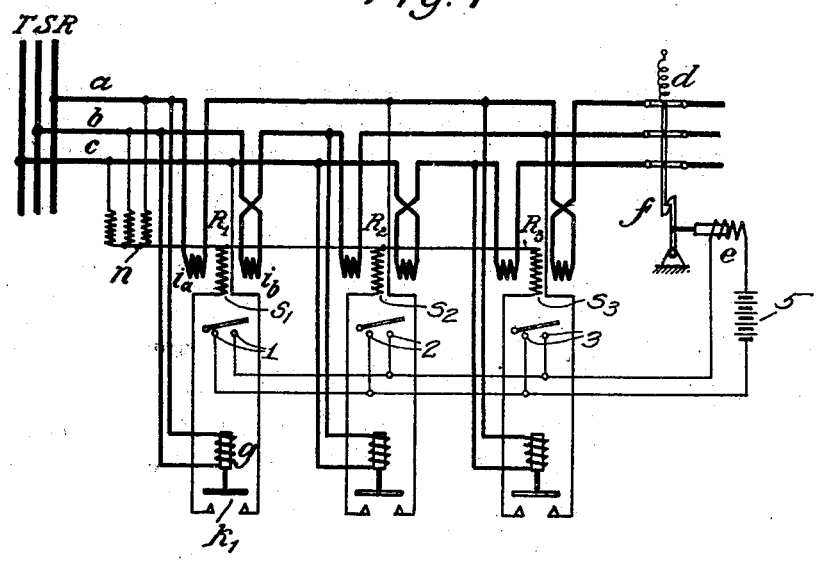

INVENTOR
Richard Bauch
BY
ATTORNEY

June 24, 1930.  R. BAUCH  1,765,395
ELECTRICAL PROTECTIVE SYSTEM
Filed Feb. 14, 1925  2 Sheets-Sheet 2

INVENTOR
Richard Bauch
BY
Wesley G. Carr
ATTORNEY

Patented June 24, 1930

1,765,395

UNITED STATES PATENT OFFICE

RICHARD BAUCH, OF BERLIN-CHARLOTTENBURG, GERMANY, ASSIGNOR TO WESTINGHOUSE ELECTRIC & MANUFACTURING COMPANY, OF NEW YORK, N. Y., A CORPORATION

ELECTRICAL PROTECTIVE SYSTEM

Application filed February 14, 1925, Serial No. 9,276, and in Germany February 8, 1924.

My invention relates to improvements in protective devices for cutting out defective sections in electric distribution networks.

When a two-phase short-circuit occurs in a three-phase current network which supplies many electric motors, the motors connected with the sound conductors of the network take up more current than under normal conditions. The consequence is that without trouble arising in the individual motors the current increases sufficiently to cause the tripping of switches which have nothing whatever to do with the short-circuit. It then happens that switches trip at several places which are far remote from the fault. Not only the excess-current relays respond but it may also happen that power directional relays in the network are operatively energized when their operation is undesirable. It may even happen that those directional relays traversed by the short-circuit current and which should cut out the defective section of the network fail to respond and thus do not close the tripping circuit of the switches.

The object of my invention is to provide a device or system in which only the power directional relays operate which are located in the defective section. My invention consists in keeping one or both of the coil systems of the directional relay (current or voltage coil system) inoperative as long as the network remains in a sound state. These coils become active only when a fault appears in the network.

In the drawing affixed to this specification and forming a part thereof, several embodiments of my invention are illustrated by way of example.

In all these figures, R, S, T are the busbars to which are connected the phase lines $a$, $b$, $c$ which are cut out by the switch $d$ when the tripping coil $e$ disengages the catch $f$. For the lines $a$, $b$, $c$ three power directional relays $R_1$, $R_2$, $R_3$ are arranged, each of which is furnished with two current coils connected with two different phases in order to form a current difference.

In Figure 1, the voltage coils $s_1$, $s_2$, $s_3$ of the relays are connected between an artificial neutral point $n$ and a phase $a$, $b$ or $c$. The current coils $i_a$ and $i_b$ of the directional relay $R_1$ for instance are connected in the phases $a$ and $b$, respectively and the voltage coil $s_1$ between the neutral point $n$ and the phase $c$. The relay coils may as a matter of course also be connected across current or voltage transformers.

According to my invention contacts $k_1$ are provided in the circuit of one of the relay coils, for instance in that of the voltage coil $s_1$. The said contacts are kept open by the contactor $g$ connected with the phases $a$ and $b$ as long as voltage prevails between these phases.

The improved system operates in the following manner: during normal service of the lines, the directional relays do not respond because their voltage coils are disconnected from the system. When a short-circuit occurs between the phases $a$ and $b$, the voltage between the said phases breaks down. The coil $g$ therefore drops its core and short-circuits the contacts $k_1$ whereby the voltage coil $s_1$ is connected between the neutral point $n$ and the phase $c$. The directional relay $R_1$ now responds and closes the circuit of the tripping coil $e$ by actuating the contacts 1 and completing the circuit through a source of power 5, whereby the switch $d$ is opened.

When a fault occurs in other phases, the corresponding directional relays $R_2$ or $R_3$ respond and bring about the tripping of the switch $d$ by closing the contacts 2 or 3 to energize the trip-coil circuit.

Figure 2:
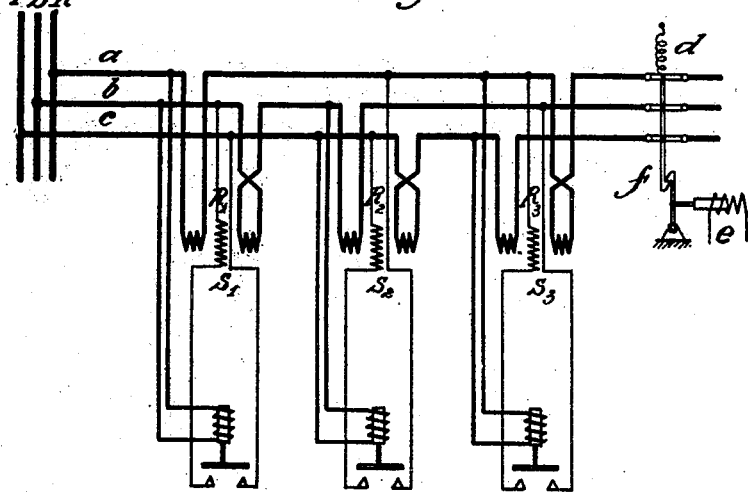

Instead of connecting the voltage coils of the directional relay between an artificial neutral point and one phase, they may equally well be connected directly with the delta voltage, as illustrated in Fig. 2.

The voltage coil $s_1$ is, for instance, connected between the phases $b$ and $c$, the voltage coil $s_2$ between the phases $c$ and $a$ and the voltage coil $s_3$ between the phases $a$ and $b$. The manner of operation of the system is similar to that illustrated in Fig. 1.

For forming the current difference the directional relays in the Figures 1 and 2 are provided with two current coils which are in reversed connection. The relays may, however, also be equipped with one current coil and one voltage coil only. A current difference may then be formed by the aid of two current transformers, the primary coils of which are connected in two phases and the secondary coils of which are in octoplex connection with the current coil of the directional relay.

Figure 3:
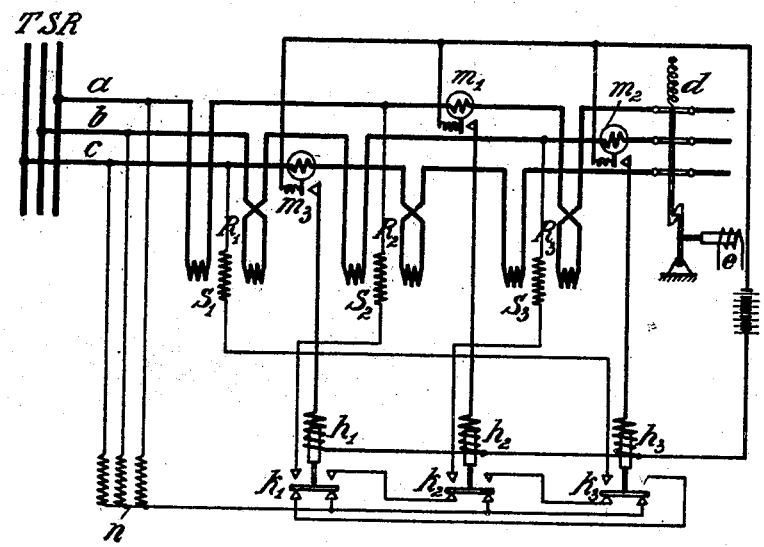

In Fig. 3, a system embodying a modified form of the invention is illustrated in which the voltage coils of the directional relays are switched in by excess-current relays which are connected in the individual phases. The directional relays $R_1$, $R_2$, $R_3$ are provided with two current coils in reversed connection and a voltage coil. The voltage coils $s_1$, $s_2$, $s_3$ are connected between an artificial neutral point $n$ and one phase each. The contacts $k_1$, $k_2$, $k_3$ in the circuits of the voltage coils are controlled by coils $h_1$, $h_2$, $h_3$ connected in the circuits of excess-current relays $m_3$, $m_1$, $m_2$. When an overload occurs in one of the phases $a$, $b$ or $c$, the excess-current relay of the corresponding phase responds and closes the circuit of the corresponding voltage coil of the directional relay. The relay responds and closes the circuit of the tripping coil $e$ by which the switch $d$ is tripped.

Figure 4:
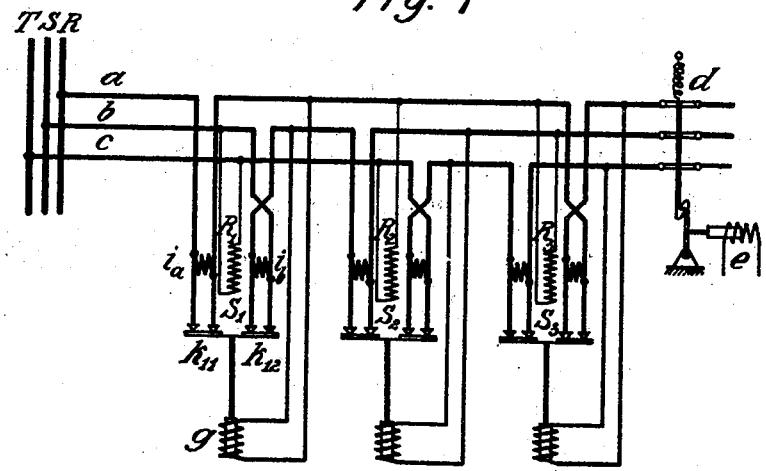

Figure 4 illustrates a further modification of the invention in which the voltage coils $s_1$, $s_2$, $s_3$ of the directional relay are permanently connected between two phases while the current coils are short-circuited in the normal state of the phases. The coils $i_a$ and $i_b$ are short-circuited by the contacts $k_{11}$ and $k_{12}$ when the coil $g$ is energized. When the voltage between the short-circuited phases breaks down, the coil $g$ drops its armature, the current coils of the directional relay receive current and the relay $R_1$ responds and cuts out the section.

The connection of the current coils, as described, may be made dependent upon the breaking down of the voltage, as indicated, it may be controlled by excess-current relays which are connected in the three phases as illustrated in Fig. 3.

What I claim is:—

1. In a polyphase electrical system, the combination with a circuit interrupter, of protective means for controlling the operation of the interrupter comprising a relay for each phase of the system provided with current-responsive winding means and a voltage-responsive winding means, and means for connecting one of the winding means to the system in such manner that the current-responsive winding means will be energized from phases other than that to which the voltage winding means is connected.

2. A protective system for a poly-phase electric power system including a relay for each phase of the system embodying current-responsive elements and a voltage-responsive element and means for imparting energy to the elements from different phases of the power system whereby an abnormal condition in the phases associated with the current elements will not affect the energization of the voltage element.

3. In a polyphase electrical system, the combination with a circuit-interrupter, of protective means operable in response to all fault conditions occurring on said system for controlling the operation of the interrupter comprising a relay for each phase of the system provided with current-responsive winding means and voltage-responsive winding means, and means for connecting one of the winding means to the system in such manner that the current-responsive winding means will be energized from phases other than that to which the voltage winding means is connected.

4. A protective system for the full protection of a polyphase electrical system irrespective of the nature of fault conditions, including a relay for each phase of the electrical system embodying current-responsive winding means and voltage-responsive winding means, and means for imparting energy to the winding means from different phases of the electrical system whereby an abnormal condition in the phases associated with the current-responsive winding means will not affect the energization of the voltage-responsive winding means.

5. A protective system for the full protection of a polyphase electrical system irrespective of the phase affected by fault conditions, including a relay for each phase of the electrical system embodying current-responsive elements and a voltage-responsive element, and means for imparting energy to the elements from different phases of the electrical system whereby an abnormal condition in the phases associated with the current elements will not affect the energization of the voltage element.

6. In a polyphase electrical system the combination with a circuit-interrupter, of protective means operable in response to all fault conditions occurring on said system for controlling the operation of the interrupter comprising a relay for each phase of the system provided with current-responsive windings and a voltage-responsive winding, and means for connecting the current windings to the system in such manner that the current-responsive windings will be energized from phases other than that to which the voltage winding is connected.

In testimony whereof I affix my signature.

RICHARD BAUCH.